United States Patent
Lys et al.

(10) Patent No.: US 8,896,229 B2
(45) Date of Patent: Nov. 25, 2014

(54) LIGHTING APPARATUS AND METHODS USING SWITCHED ENERGY STORAGE

(71) Applicant: Cree, Inc., Durham, NC (US)

(72) Inventors: Ihor Lys, La Jolla, CA (US); Robert D. Underwood, Santa Barbara, CA (US)

(73) Assignee: Cree, Inc., Durham, NC (US)

( * ) Notice: Subject to any disclaimer, the term of this patent is extended or adjusted under 35 U.S.C. 154(b) by 83 days.

(21) Appl. No.: 13/801,658

(22) Filed: Mar. 13, 2013

(65) Prior Publication Data
US 2014/0265886 A1   Sep. 18, 2014

(51) Int. Cl.
H05B 37/02   (2006.01)

(52) U.S. Cl.
CPC ..................... *H05B 37/02* (2013.01)
USPC .................. 315/291; 315/185 R; 315/308

(58) Field of Classification Search
CPC ............................ H05B 37/02; H05B 33/0815
USPC .............. 315/185 R, 186, 193, 291, 307, 308
See application file for complete search history.

(56) References Cited

U.S. PATENT DOCUMENTS

| | | | |
|---|---|---|---|
| 7,038,399 B2 | 5/2006 | Lys et al. | |
| 7,213,940 B1 | 5/2007 | Van De Ven et al. | |
| 7,986,107 B2 * | 7/2011 | Weaver et al. | 315/291 |
| 8,278,837 B1 * | 10/2012 | Lenk | 315/291 |
| 8,552,654 B2 * | 10/2013 | Lenk | 315/185 S |
| 8,786,194 B2 * | 7/2014 | Shin | 315/122 |
| 2006/0109219 A1 | 5/2006 | Robinson et al. | |
| 2007/0115228 A1 | 5/2007 | Roberts et al. | |
| 2007/0115662 A1 | 5/2007 | Roberts et al. | |
| 2009/0160363 A1 | 6/2009 | Negley et al. | |
| 2010/0194274 A1 * | 8/2010 | Hoogzaad | 315/51 |
| 2011/0025230 A1 * | 2/2011 | Schulz et al. | 315/294 |
| 2011/0068701 A1 | 3/2011 | Van de Van et al. | |
| 2011/0109247 A1 * | 5/2011 | Hoogzaad et al. | 315/294 |
| 2011/0210674 A1 | 9/2011 | Melanson | |
| 2012/0306375 A1 | 12/2012 | van de Ven | |
| 2013/0026932 A1 | 1/2013 | Lenk | |
| 2013/0069547 A1 * | 3/2013 | van de Ven et al. | 315/188 |

OTHER PUBLICATIONS

International Search Report and the Written Opinion of the International Searching Authority corresponding to International Application No. PCT/US2014/22466, date of mailing: Jun. 27, 2014; 12 pages.

* cited by examiner

*Primary Examiner* — Thuy Vinh Tran
(74) *Attorney, Agent, or Firm* — Myers Bigel Sibley & Sajovec, P.A.

(57) ABSTRACT

A lighting apparatus includes a string of serially-connected light-emitting devices including at least a first segment and a second segment and a control circuit configured to control a relationship of light outputs of the first segment and the second segment by diverting current from a node of the string to at least one energy storage device and subsequently transferring energy from the at least one energy storage device to at least the first segment. The control circuit may be configured to divert the current responsive to a control input, such as a temperature and/or a dimming level. The at least one energy storage device may include at least one inductor. In some embodiments, the control circuit may control at least one color characteristic of light produced by the string.

32 Claims, 11 Drawing Sheets

LIGHTING APPARATUS AND METHODS USING SWITCHED ENERGY STORAGE

FIELD

The inventive subject matter relates to lighting apparatus and methods and, more particularly, to solid-state lighting apparatus and methods.

BACKGROUND

Solid-state lighting arrays are used for a number of lighting applications. For example, solid-state lighting panels including arrays of solid-state light emitting devices have been used as direct illumination sources in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are often used in lighting fixtures, such as incandescent bulb replacement applications, task lighting, recessed light fixtures and the like. For example, Cree, Inc. produces a variety of light fixtures that use LEDs for illumination. The fixtures include can-type down lights, such as the LR-6 and CR-6, and troffer-type fixtures, such as the CR-24. Solid-state lighting devices may be attractive for retrofit/replacement applications, where devices such as LEDs may offer improved energy efficiency, reduced heat generation, extended life and desired performance characteristics, such as certain color and/or color rendering capabilities.

Solid-state lighting devices may include circuitry that may be used to control spectral output. The chromaticity of a particular light source may be referred to as the "color point" of the source. For a white light source, the chromaticity may be referred to as the "white point" of the source. As noted above, the white point of a white light source may fall along the Planckian locus. Accordingly, a white point may be identified by a correlated color temperature (CCT) of the light source. White light typically has a CCT of between about 2000 K and 10000 K. White light with a CCT of 3000 may appear yellowish in color, while light with a CCT of 8000 K may appear more bluish in color. Color coordinates that lie on or near the Planckian locus at a color temperature between about 2500 K and 8000 K may yield pleasing white light to a human observer.

"White" light also includes light that is near, but not directly on the Planckian locus. A Macadam ellipse can be used on a 1931 CIE Chromaticity Diagram to identify color points that are so closely related that they appear the same, or substantially similar, to a human observer. A Macadam ellipse is a closed region around a center point in a two-dimensional chromaticity space, such as the 1931 CIE Chromaticity Diagram, that encompasses all points that are visually indistinguishable from the center point. A seven-step Macadam ellipse captures points that are indistinguishable to an ordinary observer within seven standard deviations; a ten step Macadam ellipse captures points that are indistinguishable to an ordinary observer within ten standard deviations, and so on. Accordingly, light having a color point that is within about a ten step Macadam ellipse of a point on the Planckian locus may be considered to have a substantially similar color as the point on the Planckian locus.

The ability of a light source to accurately reproduce color in illuminated objects is typically characterized using the color rendering index (CRI). In particular, CRI is a relative measurement of how the color rendering properties of an illumination system compare to those of a reference illuminator, with a reference illuminator for a CCT of less than 5000K being a black-body radiator. For CCT of 5000K and above, the reference illuminator is a spectrum defined by the CIE which is similar to the spectrum of sunlight at the earth's surface. The CRI equals 100 if the color coordinates of a set of test colors being illuminated by the illumination system are the same as the coordinates of the same test colors being irradiated by the reference illuminator. Daylight has the highest CRI (of 100), with incandescent bulbs being relatively close (about 95), and fluorescent lighting being less accurate (70-85).

Generally speaking, incandescent bulbs tend to produce more natural-appearing illumination than other types of conventional lighting devices. In particular, incandescent bulbs typically go from a color temperature of about 2700K at full brightness to a color temperature of about 2000 k at 5% brightness and to a color temperature of about 1800K at about 1% brightness. This compares favorably with daylight, which varies from about 6500K at midday to about 2500 k at sunrise and sunset. Research indicates that people tend to prefer warmer color temperatures at low brightness levels and in intimate settings. U.S. Pat. No. 7,213,940 to Van De Ven et al. describes a lighting device using LEDs that can produce warm white light by combining the light from unsaturated yellow (blue-shifted yellow (BSY) LEDs and saturated red LEDs.

In illumination applications, it is often desirable to provide a lighting source that generates a light with a color behavior that approximates the behavior of incandescent lighting. LED-lighting units have been proposed that may be coupled to an AC dimmer circuit and approximate the lighting variation of a conventional incandescent light as the dimmer circuit increases or decreases the brightness of the generated light, as described in U.S. Pat. No. 7,038,399 to Lys et al.

United States Patent Publication No. 2009/0160363 describes a system in which phosphor converted LEDs and red LEDs are combined to provide white light. The ratio of the various mixed colors of the LEDs is set at the time of manufacture by measuring the output of the light and then adjusting string currents to reach a desired color. The current levels that achieve the desired color are then fixed for the particular lighting device. LED lighting systems employing feedback to obtain a desired color are described in U.S. Publication Nos. 2007/0115662 and 2007/0115228. U.S. Publication Nos. 2012/0306375 and 2011/0068701 describe various techniques for controlling LEDs in a string configuration responsive to inputs such as temperature to provide a desired color.

SUMMARY

Some embodiments provide a lighting apparatus including a string of serially-connected light-emitting devices, such as LEDs. The string includes first and second segments. The apparatus further includes at least one inductor and a control circuit configured to selectively divert current from the first segment to charge the at least one inductor while at least partially bypassing the second segment and to discharge the charged at least one inductor through at least the first segment. The control circuit may be configured to control a relationship of light outputs of the first and second segments. For example, the first and second segments may produce different spectra, and the control circuit may be configured to control at least one color characteristic (e.g., color point, color temperature, color rendering index, etc.) of light produced by the string.

In some embodiments, the control circuit may be configured to control a relationship between currents passing through the first and second segments. The control circuit may be configured to control the relationship responsive to a control input, such as a temperature and/or a dimming level.

In some embodiments, the control circuit may be configured to vary a duration of charging of the at least one inductor responsive to the control input. The control circuit may be configured to charge and discharge the at least one inductor in bursts of multiple charge/discharge cycles with the same first duty cycle, and the control circuit may be further configured to vary a second duty cycle of the bursts responsive to the control input.

In some embodiments, the at least one inductor may include a first terminal configured to be coupled to a first node of the first segment. The control circuit may include a first switch coupled to a second terminal of the at least one inductor and configured to control a current path bypassing the second segment via the at least one inductor and a second switch coupled to the second terminal of the at least one inductor and to a second node of the first segment. The first switch may include a transistor and the second switch may include a diode.

In some embodiments, the first and second segments may produce different spectra. For example, in some embodiments, the first segment may produce a predominantly red spectrum and the second segment may produce a predominantly white spectrum. In some embodiments, the first segment may produce a predominantly white spectrum and the second segment may produce a predominantly red spectrum.

In further embodiments of the inventive subject matter, an apparatus includes at least one inductor configured to be coupled to a node of a string of serially-connected light-emitting devices including at least a first segment and a second segment. A control circuit is configured to selectively divert current from the first segment to charge the at least one inductor while at least partially bypassing the second segment and to discharge the charged at least one inductor through at least the first segment. The control circuit may be configured to control a relationship between currents passing through the first and second segments. The control circuit may be configured to control the relationship responsive to a control input, such as a temperature and/or a dimming level.

In still further embodiments, a lighting apparatus includes a string of serially-connected light-emitting devices including at least a first segment and a second segment and a control circuit configured to control a relationship of light outputs of the first segment and the second segment by diverting current from a node of the string to at least one energy storage device and subsequently transferring energy from the at least one energy storage device to at least the first segment. The control circuit may be configured to divert the current responsive to a control input, such as a temperature and/or a dimming level. The at least one energy storage device may include at least one inductor.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
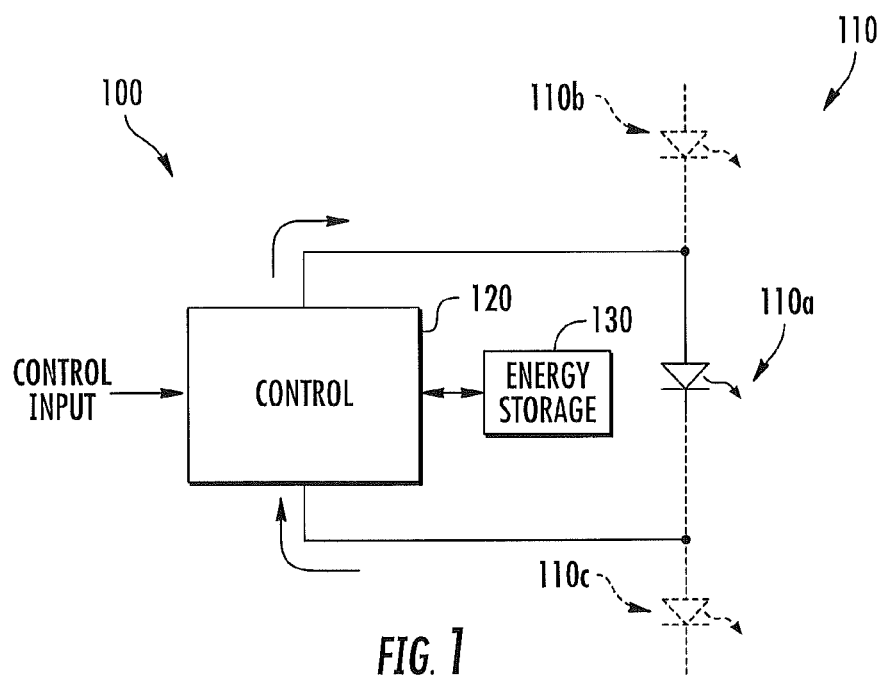
FIG. 1 illustrates a LED lighting apparatus according to some embodiments.

Embodiments of the inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The inventive subject matter may further relate to an illuminated enclosure (the volume of which can be illuminated uniformly or non-uniformly), including an enclosed space and at least one lighting apparatus according to the inventive subject matter, wherein the lighting apparatus illuminates at least a portion of the enclosed space (uniformly or non-uniformly).

FIG. 1 illustrates an LED lighting apparatus 100 according to some embodiments. The apparatus 100 includes at least one string 110 of serially connected LEDs, including at least two segments. The segments may include a first segment 110a and at least one other second segment 110b, 110c, which may be coupled on either end of the first segment 110a. The string 110 may be coupled, for example, to a current source. In some embodiments, the string 110 may be coupled in serial and/or in parallel with other circuitry, including, but not limited to, one or more LED strings and/or other loads.

The apparatus 100 further includes a control circuit 120 configured to selectively divert current passing through the first segment 110a into an energy storage device 130 and to subsequently discharge the energy storage device 130 through at least the first segment 110a. Such operations may be used to control a relationship between currents (e.g., relative average current levels) in the first segment 110a and the at least one second segment 110b, 110c. In some embodiments, for example, the control circuit 120 may be configured to control at least one color characteristic (e.g., color point, coordinated color temperature (CCT), color rendering index (CRI), etc.) and/or other characteristics of the light produced by the string 110.

It will be understood that individual ones of the first segment 110a and the at least one second segment 110b, 110c may include one or more LEDs. The first segment 110a and/or the at least one second segment 110b, 110c may individually include, for example, single LEDs, two or more serially connected LEDs, one or more parallel connected LEDs and/or combinations of serially and parallel connected LEDs. The first segment 110a and the at least one second segment 110b, 110c may individually include LEDs having the same color or combinations of LEDs of different colors. The first segment 110a and the at least one second segment 110b, 110c may be configured to provide substantially the same color or may provide different colors.

The energy storage device 130 may comprise any of a number of different types of storage devices. For example, in some embodiments, the energy storage device 130 may include at least one inductor, and the control circuit 120 may be configured to intermittently direct current passing through the first segment 110a to the at least one inductor to charge the at least one inductor. The control circuit 120 may be further configured to discharge the at least one inductor back through at least the first segment 110a. Relative outputs of the first segment 110a and the at least one second segment 110b, 110c may be controlled by the timing of charging and discharging intervals.

The control circuit 120 may be implemented using any of a number of different circuit arrangements. It will be appreciated that, in general, the control circuit 120 may be implemented using analog circuitry, digital circuitry (including, for example, data processing devices, such as microcontrollers) and combinations thereof. Such circuitry may be implemented using discrete devices and/or integrated circuit devices, such as one or more application specific integrated circuit (ASIC) devices.

Figure 2:
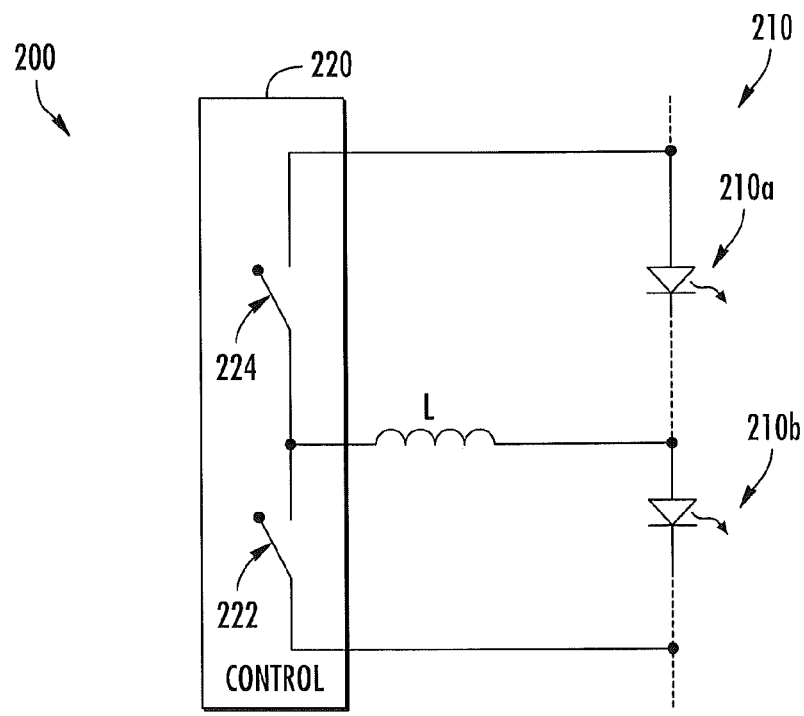
FIG. 2 illustrates an LED lighting apparatus using a switched inductor according to some embodiments.

FIG. 2 illustrates a lighting apparatus 200 using an inductor in such a manner according to some embodiments of the inventive subject matter. The apparatus includes a string 210 of LEDs, including a first segment 210a and a second segment 210b. It will be understood that the first and second segments 210a and 210a may include one or more LEDs. The first segment 210a and/or the second segment 210b may individually include, for example, single LEDs, two or more serially connected LEDs, one or more parallel connected LEDs and/or combinations of serially and parallel connected LEDs. The first and second segments 210a, 210b may individually include LEDs having the same color or combinations of LEDs of different colors. The first and second segments 210a, 210a may have substantially the same lighting characteristics (e.g., color) or may have different lighting characteristics.

A first terminal of an inductor L is coupled to a node of the string 210 between the first and second segments 210a, 210b. A control circuit 220 is coupled to a second terminal of the inductor L and is configured to control charging and discharging thereof. In some embodiments, the control circuit 220 may be configured to intermittently (e.g., periodically) divert current from the first segment 210a through the inductor L to charge the inductor L and to discharge the charged inductor through at least the first segment 210a. The timing of the charging and discharging of the inductor L may be used to control relative outputs of the first and second segments 210a, 210b by controlling currents flowing therethrough.

As shown, the control circuit 220 includes a first switch 222, which is configured to selectively conduct current from the first segment 210a through the inductor L and on to a second node of the string 210. The control circuit 220 further includes a second switch 224, which is configured to selectively conduct current from the inductor L to a second node of the string such that the current may be conducted through the first segment 210a. When the first switch 222 is closed, current flows through the inductor L, charging the inductor L. At a subsequent time, the first switch 222 may be closed and the second switch 224 opened, allowing current to flow from the charged inductor L to the first segment 210a. It will be appreciated that the first and second switches 222, 224 may include any of a variety of different devices. For example, in some embodiments described below, the first switch 22 may be a transistor or similar actively controlled device, and the second switch may be a diode or similar device controlled by a bias applied thereto.

Figure 3:
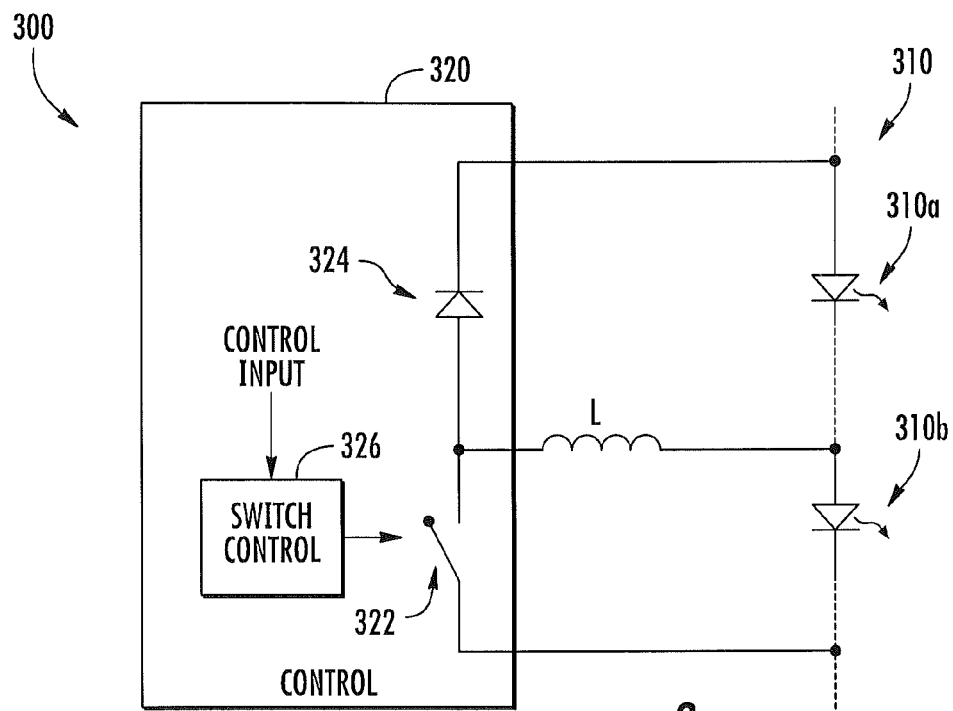
FIG. 3 illustrates an LED lighting apparatus using a switched inductor according to further embodiments.

FIG. 3 illustrates an LED lighting apparatus 300 according to further embodiments. The apparatus 300 includes a string 310 of serially connected LEDs including a first segment 310a and a second segment 310b. An inductor L has a first terminal coupled to a node of the string 310 between the first and second segments 310a, 310b. A control circuit 320 is coupled to a second terminal of the inductor L and includes a first switch 322 that is controlled by a switch control circuit 326 responsive to a control input. A second switch in the form of a diode 324 is configured to support discharge of the charged inductor L.

The first switch 322 may be closed to cause current to flow from the first segment 310a through the inductor L, bypassing the second segment 310b and charging the inductor L. In particular, when the first switch 322 is opened at the end of a charging interval, the diode 324 becomes forward biased as voltage develops across the inductor L due to interruption of current by the opening of the first switch 322. As a result, current flows from the charged inductor L through the first segment 310a. As explained in detail below, the duration and/or frequency at which the inductor L is charged and discharged can be used to control a relationship between light outputs of the first and second segments 310a, 310b.

In various embodiments, switched inductor circuits along the lines described above with reference to FIGS. 2 and 3 may be used to control at least one color characteristic produced by an LED string. For example, in some embodiments, a switched inductor circuit along the lines shown in FIGS. 2 and 3 may be used to provide temperature compensation for the color output of an LED lighting apparatus, such that the LED lighting apparatus may maintain a desired color in the presence of variations in light output of respective different types of LEDs over temperature. In some embodiments, such control circuitry may also be used to provide a desired color response to inputs such as dimming control inputs such that, for example, an LED lighting apparatus may approximate the behavior of an incandescent lamp in response to such a dimming input.

Figure 4:
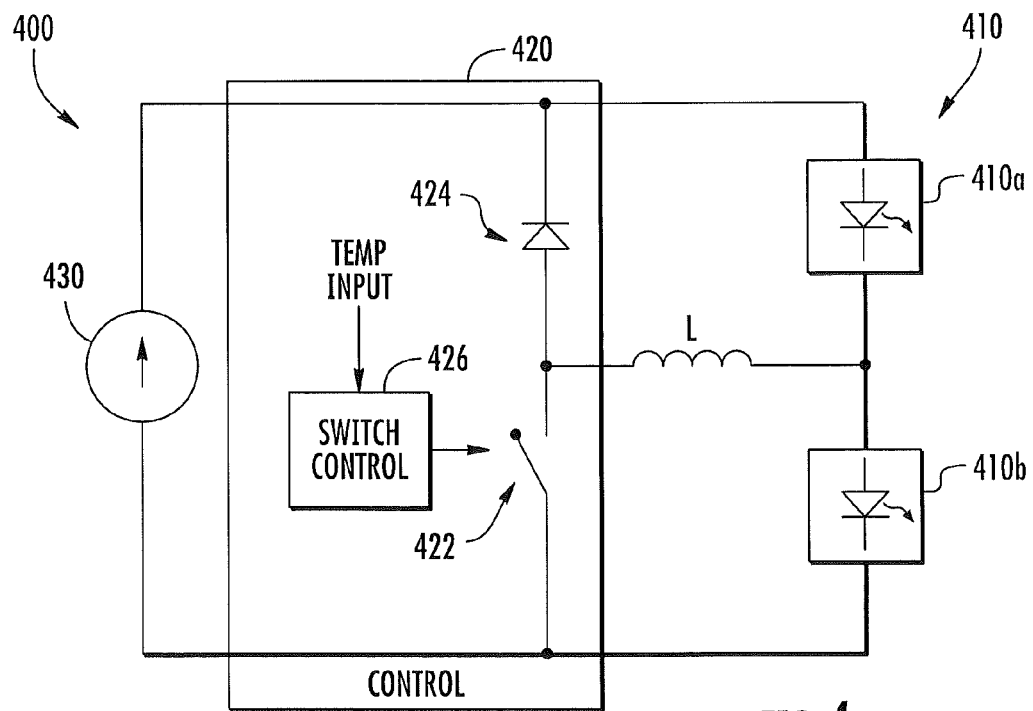
FIG. 4 illustrates an LED lighting apparatus using an inductor switched responsive to a temperature input according to some embodiments.

FIG. 4 illustrates use of a switched inductor circuit to control color in response to temperature variations in some embodiments. A lighting apparatus 400 includes a string 410 of serially connected LEDs including a first segment 410a having a first color and a second segment 410b having a second color. The individual first and second segments 410a, 410b may include, for example, single LEDs, two or more serially connected LEDs, one or more parallel connected LEDs and/or combinations of serially and parallel connected LEDs. The individual first and second segments 410a, 410b may include LEDs having the substantially the same color or combinations of LEDs of different colors. For example, in some embodiments, one of the first and second segments 410a, 410b may provide predominantly red light while the other one of the first and second segments 410a, 410b may provide predominantly white light. It will be appreciated, however, that other embodiments may use color LEDS in various other arrangements.

The apparatus 400 further includes an inductor L having a first terminal coupled to a node between the first and second segments 410a, 410b. A control circuit 420 is coupled to a second terminal of the inductor L and includes a first switch 422 configured to support diversion of current from the first segment 410a through the inductor L responsive to a temperature input to a switch control circuit 426 that controls the first switch 422. The temperature input may, for example, be a temperature signal generated by a thermistor, thermocouple or other temperature sensor configured to sense a temperature of the first and second segments 410a, 410b.

A second switch in the form of a diode 424 is configured to support discharge of the inductor L through at least the first segment 410a responsive to opening of the first switch 422. The duration and frequency at which the first switch 422 is opened and closed can be controlled responsive to the temperature input to adjust average currents through the first and second segments 410a, 410b. In this manner, a desired color may be maintained in the presence of temperature variations, compensating for differences in temperature responses of the first and second segments 410a, 410b.

Figure 5:
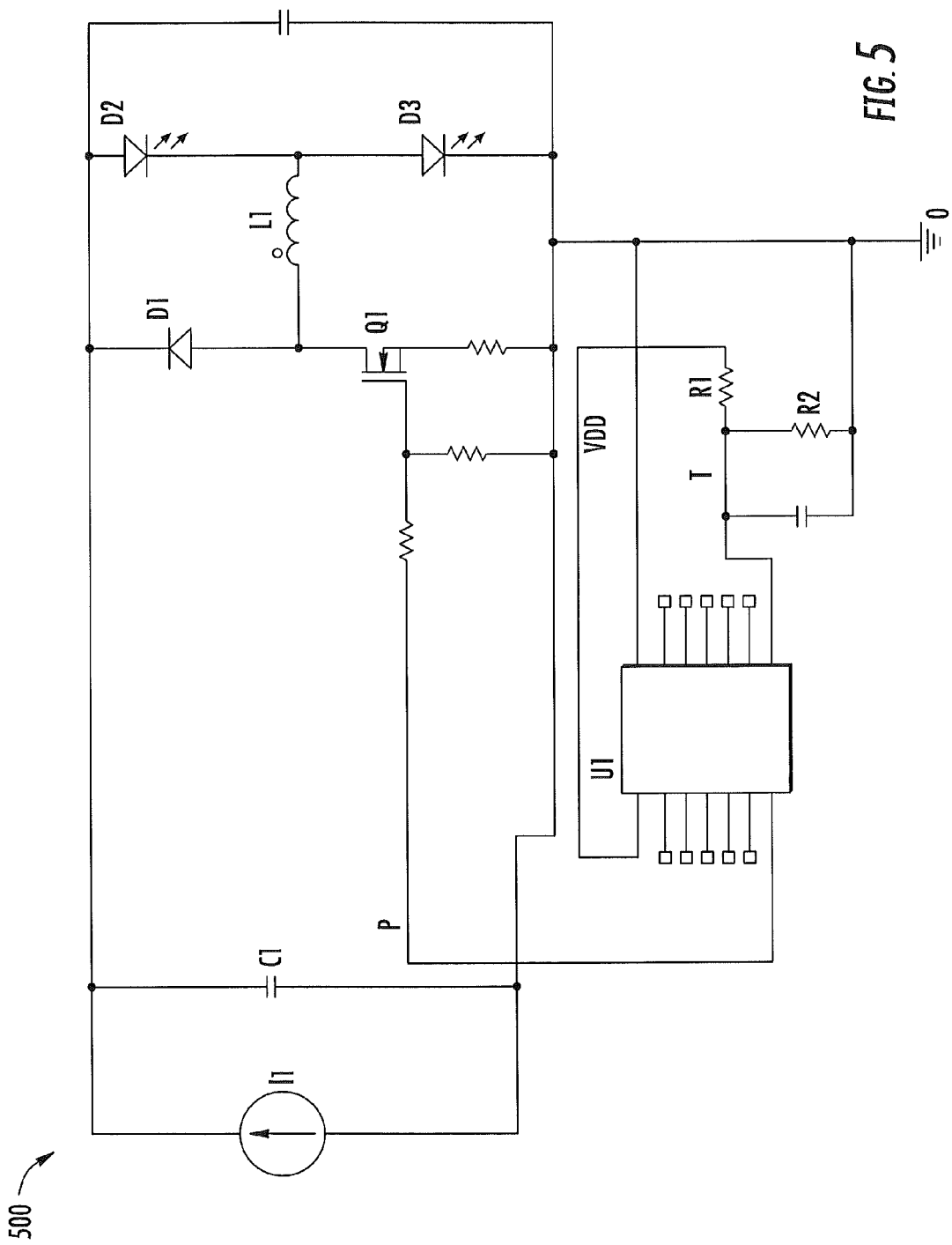
FIG. 5 illustrates a circuit implementation for an LED lighting apparatus according to some embodiments.

FIG. 5 illustrates an example circuit implementation along the lines of the apparatus of FIG. 4. A lighting apparatus 500 includes first and second serially connected segments including respective LEDs segments D2, D3 (including one or more LEDs each) coupled between terminals of a current source that produces a current I1. As explained in greater detail below with reference to FIGS. 8-13, the LED segments D2, D3 may produce respective different colors. An inductor L1 has a first terminal coupled to a node between the LED segments D2, D3 and a second terminal coupled to a transistor Q1 and a diode D1. The transistor Q1 provides a switchable current path that allows current to flow into the inductor L1 from the first LED segment D2, at least partially bypassing the second LED segment D3. The transistor is controlled by a control signal P produced by a microcontroller U1, e.g., a logic "high" level of the control signal P causes the transistor Q1 to turn on and allow current to flow through the inductor L1 and at least partially bypass the second diode D3 and a logic "low" of the control signal P causes the transistor Q1 to turn off and initiate discharge of the charged inductor L1 via the diode D1 and the first LED segment D2.

A temperature signal T is output by a voltage divider circuit including a thermistor R1 and a resistor R2 and applied to an input of the microcontroller U1, which also provides a bias voltage VDD to the voltage divider circuit. It will be appreciated that the thermistor R1 may be thermally coupled to the LED segments D2, D3 to sense a temperature thereof. The microcontroller U1 may be programmed to control generation of the control signal P responsive to the temperature signal provided by the voltage divider such that currents through the first and second diodes D2, D3 are varied to provide a desired temperature compensation.

Figure 6:
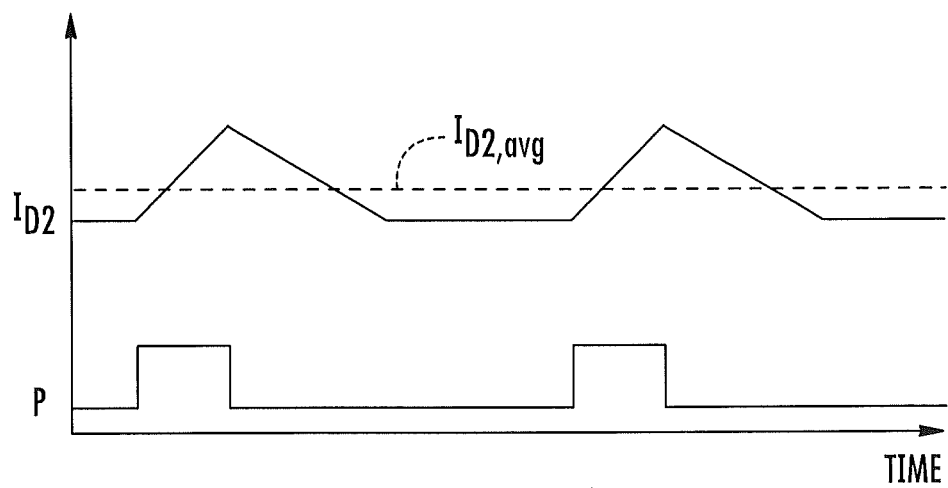
FIGS. 6 and 7 illustrate operations of the lighting apparatus of FIG. 5.

Referring to FIG. 6, the microcontroller U1 may be configured to generate the control signal P as a periodic pulse signal. As shown, when the control signal P goes "high," a current ID2 through the first LED segment D2 begins to increase as current flows into the inductor L1. When the control signal P again goes "low," the inductor L1 changes polarity and begins to discharge via the diode D1, maintaining an elevated current level in the first LED segment D2 that eventually decays as the inductor L1 fully discharges. It will be appreciated that, in some embodiments, an average current ID2, avg through the first LED segment D2 may be controlled by varying the duty cycle of the control signal P, e.g., increasing the time that the control signal P is "high" relative to "low" increases (subject to saturation of the inductor L1) the average current through the first LED segment D2 in relation to the average current through the second LED segment D3, which is at least partially bypassed during the "on" period of the transistor Q1.

Figure 7:
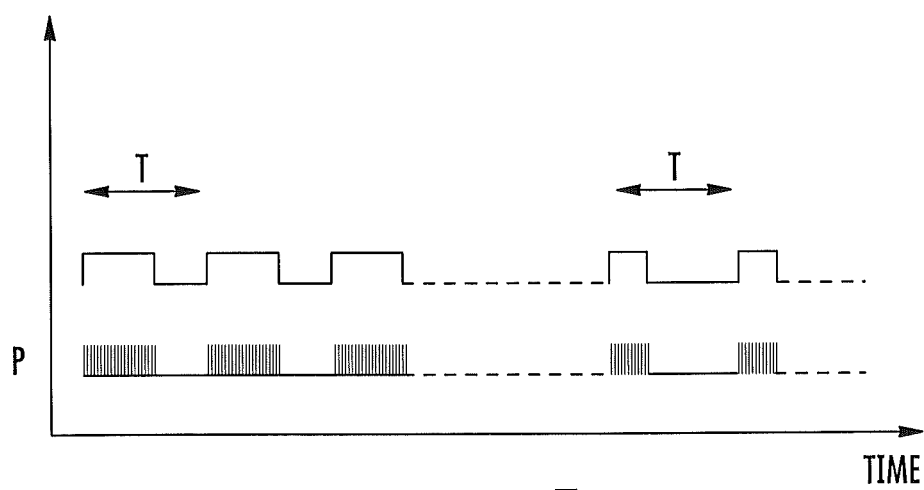

Referring to FIG. 7, in some embodiments, the control signal P may comprise a periodic series of bursts using a fixed duty cycle within each burst. Outputs of the LED segments D2, D3 are controlled by varying a duty cycle of the bursts. In particular, within an active portion of a burst period T, the control signal may be repeatedly pulsed at a fixed rate and duty cycle. The average currents through the first and second LEDs may be varied by varying the duty cycle of the burst period T, i.e., by increasing or decreasing the burst length. It will be appreciated that other signaling schemes may be used in other embodiments of the inventive subject matter.

It will be appreciated that light output of an LED for a given current level may vary with temperature, and that LEDs with different colors may have different temperature responses. As noted above, the first and second LED segments D2, D3 in the apparatus 500 of FIG. 5 may produce different colors, and the microcontroller U1 may operate to control a control point of an aggregate output of the LED segments D2, D3 as temperature varies.

Figure 8:
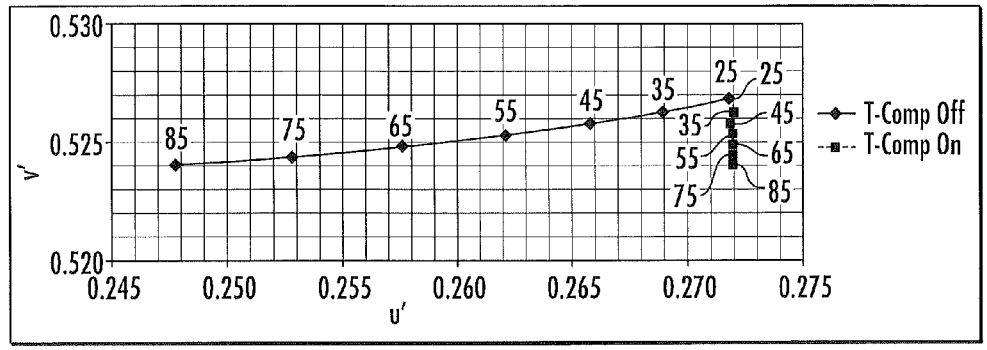
FIGS. 8-13 illustrate performance of the lighting apparatus of FIG. 5.
Figure 9:
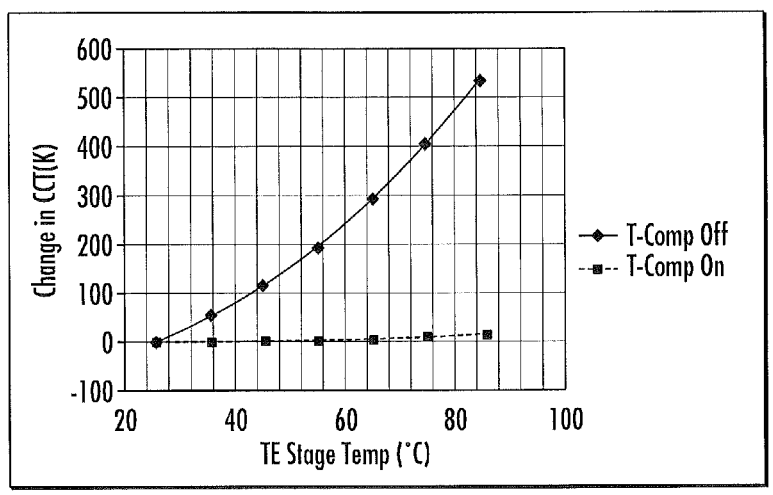
Figure 10:
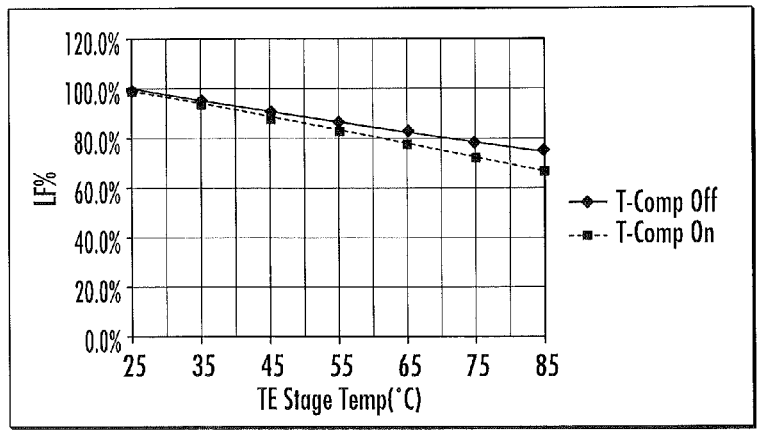

FIGS. 8-10 provide a comparison of compensated and uncompensated temperature performance for a circuit along the lines of FIG. 5, wherein the upper LED segment D2 is red and the lower LED segment D3 is white. As shown in FIG. 8, the output of the apparatus varies more widely in a CIE u', v' space over a temperature range from 25° C. to 85° C. for the uncompensated case than for the compensated case. Color compensation may be further appreciated by reference to the correlated color temperature (CCT) curves in FIG. 9, which show that a temperature compensated apparatus may maintain a more tightly constrained CCT over such a temperature range in comparison to a similar device without temperature compensation. As shown in FIG. 10, for the given LEDs, use of temperature compensation in such a configuration may lead to some loss of efficiency at increased temperatures of the LED segments D2, D3 (e.g., near the normal steady state operating temperature). This loss of efficiency may be at least partially attributable to increasing the time average current through red LEDs at the expense of average current through the white LEDs. Losses in the switching transistor Q1 due to increased switching as the LED segments D2, D3 heat up may also reduce efficiency.

Figure 11:
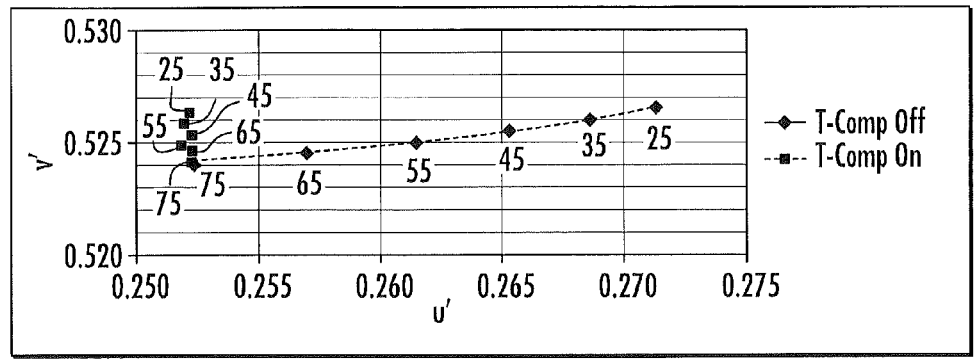
Figure 12:
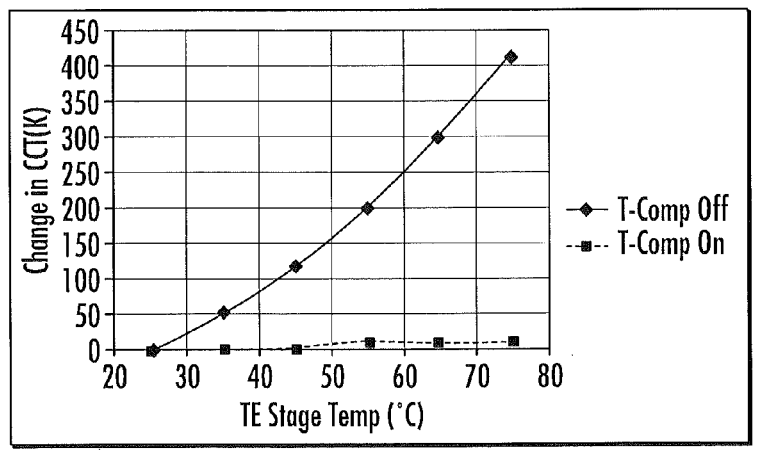
Figure 13:
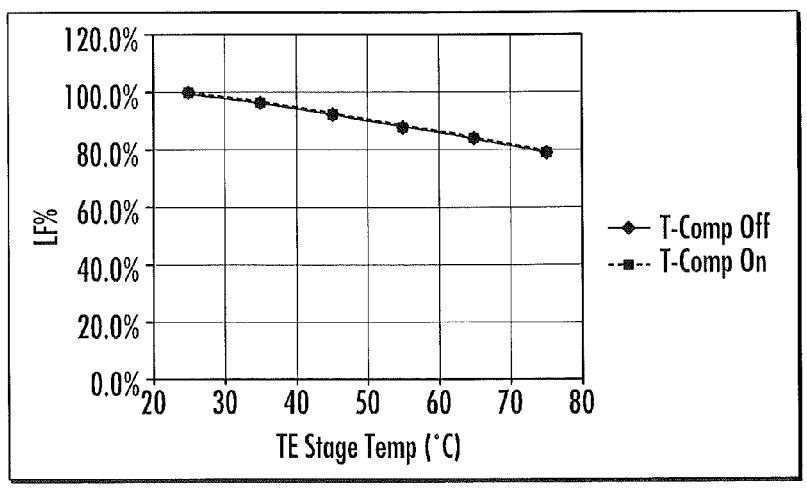

FIGS. 11-13 provide a comparison of compensated and uncompensated temperature performance for a circuit along the lines of FIG. 5, wherein the upper LED segment D2 is white and the lower LED segment D3 is red. Referring to FIGS. 11 and 12, color variation of the apparatus may be more constrained over temperature when compensation is used in comparison to an uncompensated string. Referring to FIG. 13, unlike the arrangement described above with reference to FIGS. 8-10, this arrangement may result in less loss of efficiency as temperature increases. Accordingly, this arrangement may be superior for this combination of LEDs, but it will be appreciated that performance of the circuitry with temperature generally depends on the characteristics of the LEDs being used.

According to further embodiments, circuitry along the lines of FIGS. 1-3 may also be used to provide dimming-correlated compensation. For example, in some LED lighting applications, it may be desirable that an LED lamp or fixture provide a color response to dimming similar to that provided by a conventional incandescent lamp. In particular, a typical conventional incandescent lamp will exhibit a color temperature that generally follows a blackbody locus as the lamp is dimmed, i.e., the output of the lamp will become "redder" (lower CCT) as it dims and "bluer" (higher CCT) as it brightens.

Figure 14:
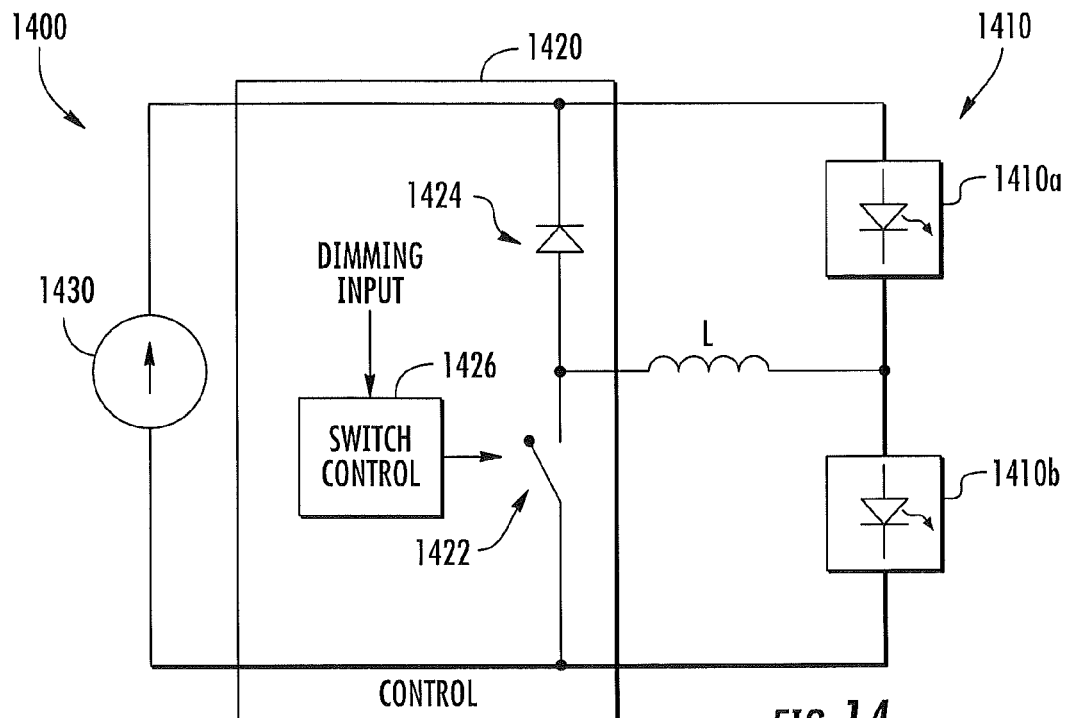
FIG. 14 illustrates an LED lighting apparatus using an inductor switched responsive to a dimming input according to some embodiments.

FIG. 14 illustrates a lighting apparatus 1400 according to some embodiments that uses a switched inductor circuit that is controlled responsive to a dimming input to control at least one color characteristic of light produced by the apparatus 1400. The apparatus 1400 includes a string 1410 including a first segment 1410a and a second segment 1410b coupled in series with a current source 1430. The first and second segments 1410a, 1410b may produce light of different colors (e.g., red and white). An inductor L has a first terminal coupled to a node of the string 1410 between the first and second segments 1410a, 1410b.

A control circuit 1420 is coupled to a second terminal of the inductor L and includes a first switch 1422 and a second switch 1424 (a diode) configured to support charging and discharging of the inductor L to provide color control. A switch control circuit 1426 (e.g., a microcontroller or other control circuit) is configured to control the first switch 1422 responsive to a dimming input. The switch control circuit 1426 may be configured to operate the switch 1422 to provide a particular color response so that, for example, the apparatus 1400 provides an output that approximates that of an incandescent lamp in response to the dimming input. The dimming input may take any of a number of different forms. For example, the dimming input may include a phase cut dimming signal, a 0-10V (1-10V) dimming signal or a signal representative of a current produced by the current source 1430, which, in turn, may be controlled by a dimming signal such as a phase cut signal, a 0-10V (1-10V) signal or some other dimming control signal.

Figure 15:
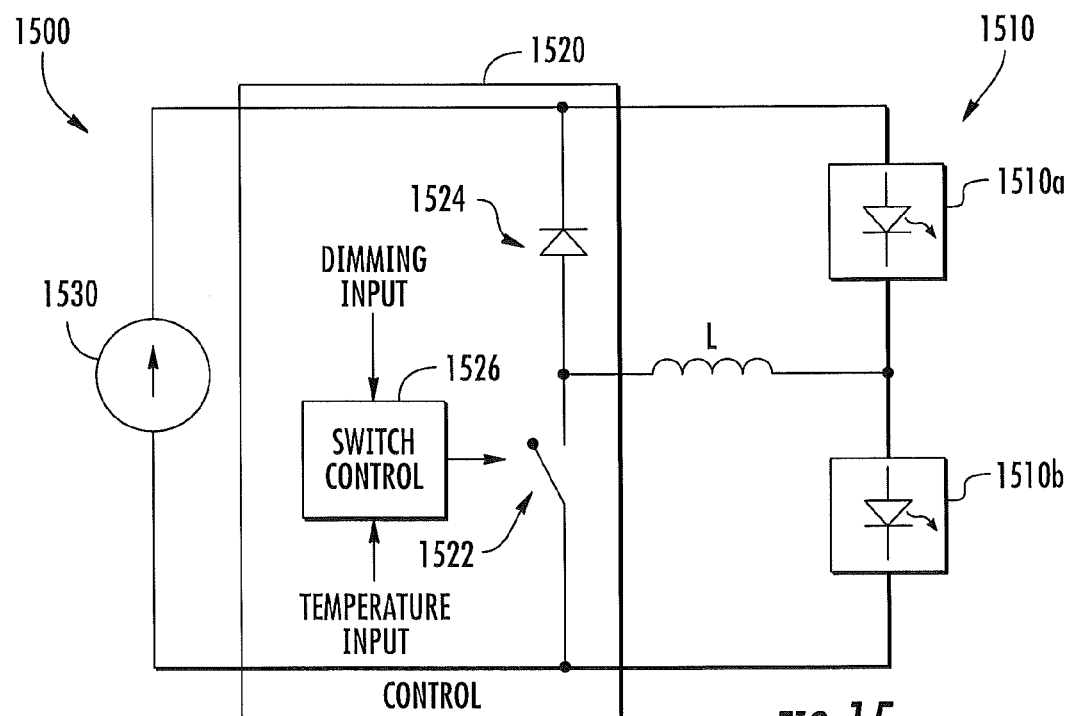
FIG. 15 illustrates an LED lighting apparatus using an inductor switched responsive to temperature and dimming inputs according to further embodiments.

According to further embodiments, switched inductor circuits similar to those described above may operate responsive to multiple control inputs. For example, FIG. 15 illustrates a lighting apparatus 1500 according to some embodiments that uses a switched inductor circuit that is controlled responsive to both temperature and dimming inputs to control at least one color characteristic of light produced by the apparatus 1500. The apparatus 1500 includes a string 1510 including a first segment 1510a and a second segment 1510b coupled in series with a current source 1530. It will be understood that individual ones of the first and second segments 1510a, 1510b may include one or more LEDs. The first and second segments 1510a, 1510b may individually include, for example, single LEDs, two or more serially connected LEDs, one or more parallel connected LEDs and/or combinations of serially and parallel connected LEDs. The first and second segments 1510a, 1510b may produce light of different colors (e.g., red and white). An inductor L has a first terminal coupled to a node of the string 1510 between the first and second segments 1510a, 1510b.

A control circuit 1520 is coupled to a second terminal of the inductor L and includes a first switch 1522 and a second switch 1524 (a diode) configured to support charging and discharging of the inductor L to provide color control. A switch control circuit 1526 (e.g., a microcontroller or other control circuit) is configured to control the first switch 1522 responsive to a dimming input and a temperature input. The switch control circuit 1526 may be configured to operate the switch 1522 to provide a particular color response to the dimming input and the temperature input so that, for example, the apparatus 1500 provides an output that approximates that of an incandescent lamp in response to the dimming input while also compensating for variations in the output of the segments 1510*a*, 1510*b* due to temperature changes.

Embodiments of the inventive subject matter may be configured in any of a number of different physical arrangements, including, but not limited to, light fixtures, lamps, lighting apparatus configured to illuminate areas or volumes (e.g., backlights in devices such as cell phones or computers), and the like. Components of such apparatus may be arranged in any of a number of different ways, such as integrated in a single assembly such as a lamp and/or implemented as a combination of interconnected or interconnectable units or modules. Such units or modules may include circuitry that is integrated in forms such as integrated circuits or hybrid circuit modules.

Figure 16:
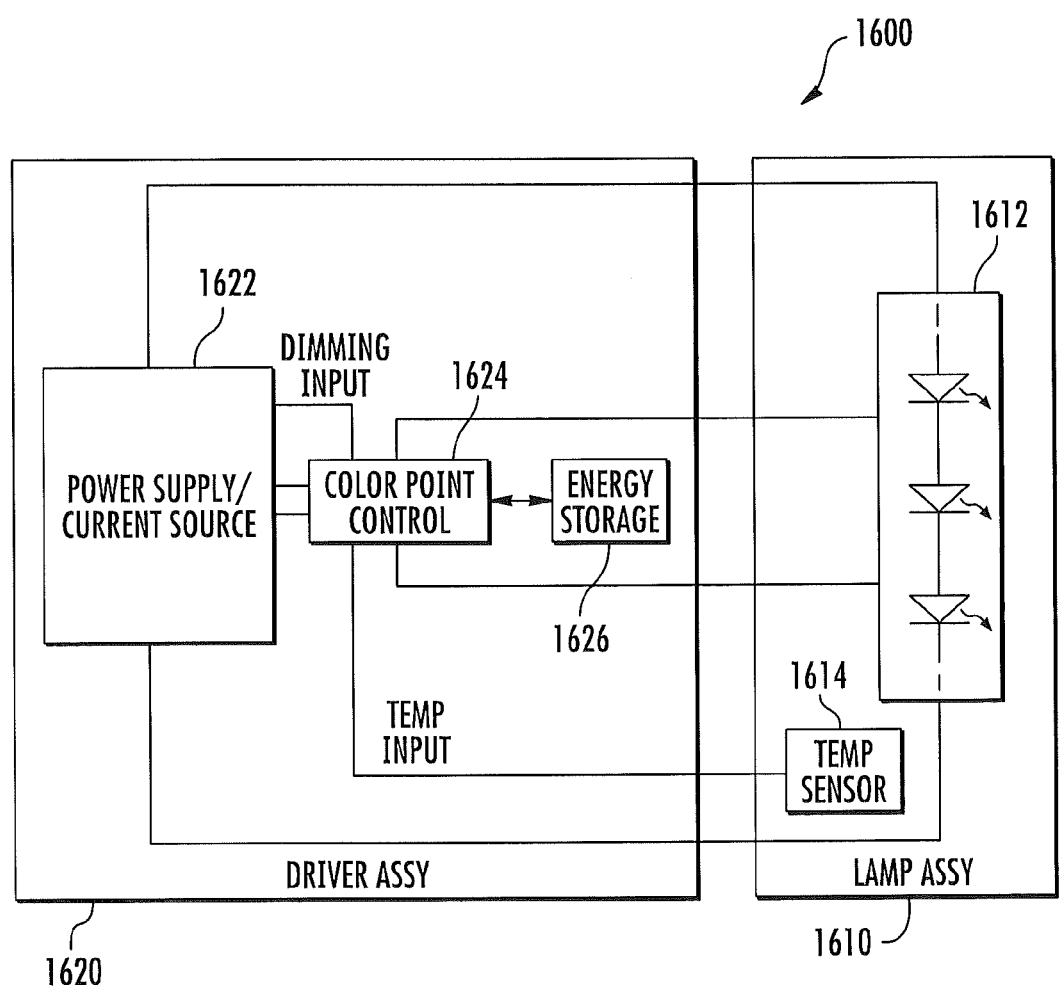
FIG. 16 illustrates a lighting fixture apparatus according to some embodiments.

FIG. 16 illustrates an example arrangement for a lighting fixture apparatus 1600 according to some embodiments. The apparatus 1600 includes a lamp assembly 1610 including and LED assembly 1612, which may include two or more serially-connected segments along the lines described above. It will be understood that individual ones of the segments may include one or more LEDs. The segments may individually include, for example, single LEDs, two or more serially connected LEDs, one or more parallel connected LEDs and/or combinations of serially and parallel connected LEDs. The segments may individually include LEDs having the same color or combinations of LEDs of different colors. The segments may be configured to provide substantially the same color or may provide different colors. The lamp assembly 1610 further includes a temperature sensor 1614 (e.g., a thermistor, thermocouple or other temperature sensing device) configured to sense a temperature of the LED assembly 1612.

A driver assembly 1620 is configured to be coupled to the lamp assembly 1610. The driver assembly 1620 includes a power supply/current source circuit 1622 that is configured to receive input power and to provide a controlled current to the LED assembly 1612 of the lamp assembly 1610. The driver assembly 1620 further includes a color control circuit 1624, which is coupled to the LED assembly 1612 and configured to provide color control using an attached energy storage device 1626 (e.g., an inductor). The control circuit 1624 may perform, for example, operations along the lines of those described above with reference to FIGS. 1-15. As shown, for example, the color control circuit 1624 may be configured to control current flows through different color segments of the LED assembly 1612 responsive to a dimming input provided by the power supply/current source circuit 1622 and a temperature signal provided by the temperature sensor 1614. As further shown, the color control circuit 1624 may be powered by the power supply/current source circuit 1622. It will be appreciated that the arrangement illustrated in FIG. 16 may be used in a variety of different types of lighting apparatus including, but not limited to, indoor lighting fixtures, such as ceiling-mounted troffers, recessed downlights, task lights and wall-mounted fixtures, and outdoor fixtures, such as street lights and security lights.

Figure 17:
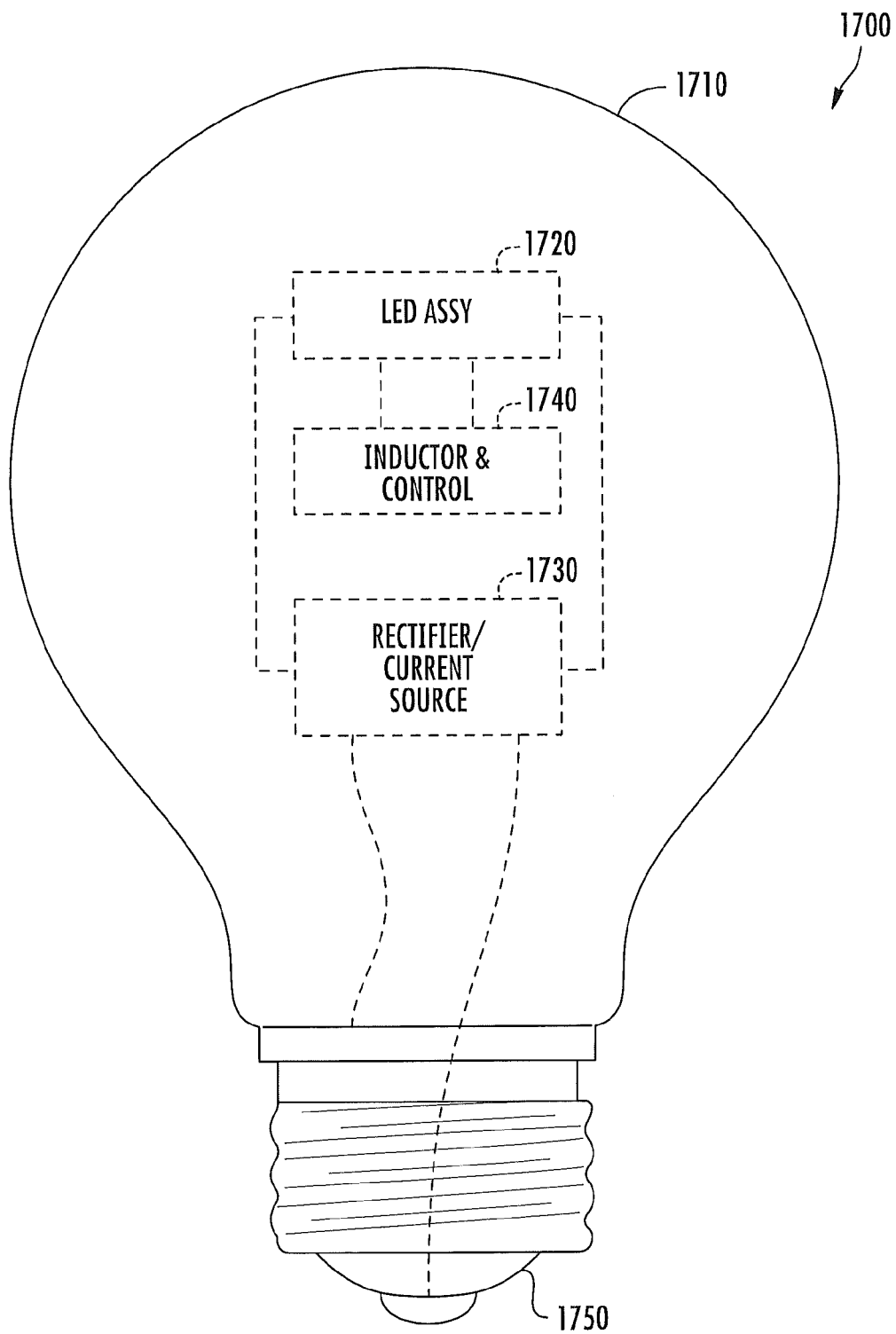
FIG. 17 illustrates a lamp apparatus according to some embodiments.

FIG. 17 illustrates an implementation in a lamp 1700 according to further embodiments. The lamp 1700 includes a translucent or transparent enclosure 1710, which contains lighting circuitry including an LED assembly 1720 including one or more LED segments as described above. The enclosure 1710 further contains a rectifier/current, source circuit 1730 that provides a current to the LED assembly 1720, and an inductor and control circuit 1740. The rectifier/current source circuit 1730 is configured to receive power from a screw type lamp base 1750. The inductor and control circuit 1740 may be configured to operate to provide color control responsive to temperature and/or dimming inputs along the lines discussed above. It will be appreciated that internal components of the lamp 1700 may be integrated in one or more circuit assemblies (e.g., circuit boards and/or hybrid circuit assemblies), configured to be mounted within the housing 1710.

Figure 18:
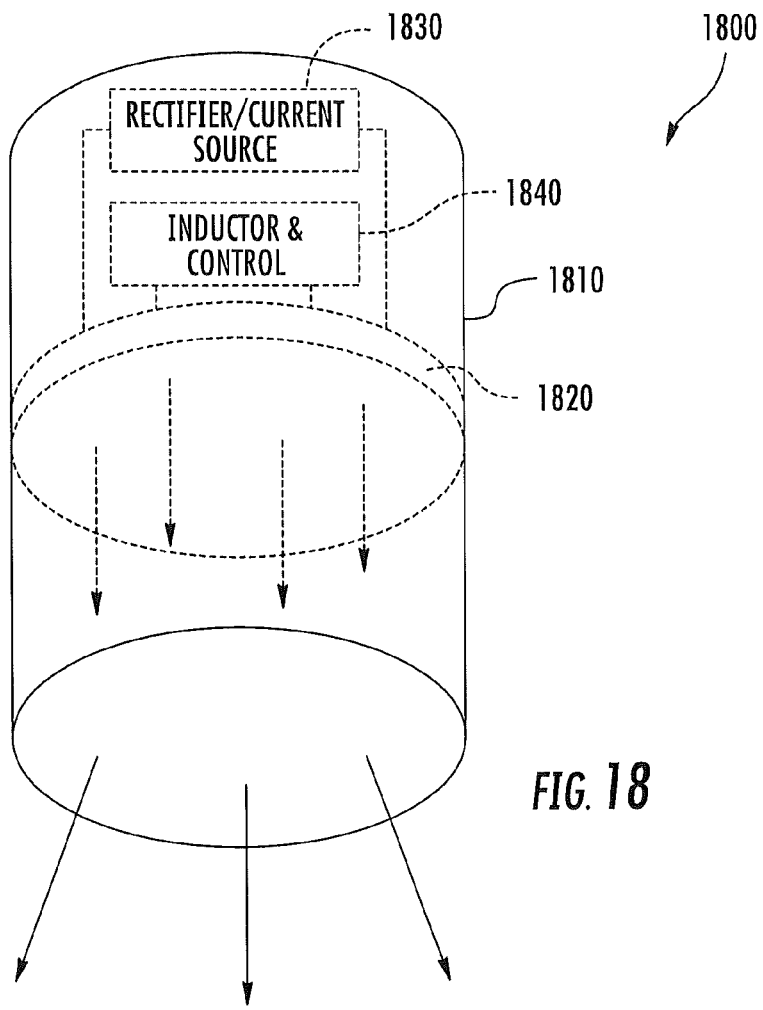
FIGS. 18 and 19 illustrate a recessed lighting apparatus according to some embodiments.
Figure 19:
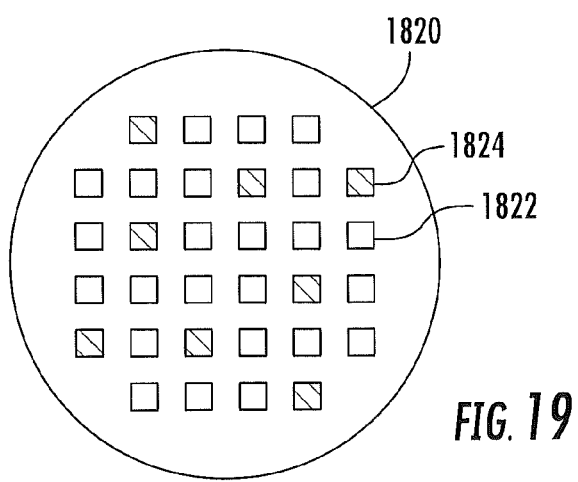

FIG. 18 illustrates a recessed lighting fixture 1800 according to further embodiments. The lamp 1800 includes a housing 1810 configured to be mounted in a recessed fashion in a ceiling. The housing 1810 contains lighting circuitry including a lamp assembly 1820 including at least one LED string. As shown in FIG. 19, the lamp assembly 1820 may include one or more LEDs 1822 of a first color (e.g., red) and LEDs 1824 of a second color (e.g., white) arranged such that light therefrom is combined. Referring again to FIG. 18, the fixture 1800 further includes a rectifier/current source circuit 1830 that provides a current to the LED assembly 1820 and an inductor and control circuit 1840 coupled to the LED assembly 1820. The rectifier/current source circuit 1830 is configured to receive power from an external source. The inductor and control circuit 1840 may be configured to operate to provide color control responsive to temperature and/or dimming inputs along the lines discussed above. It will be appreciated that internal components of the fixture 1800 may be integrated in one or more circuit assemblies (e.g., circuit boards and/or hybrid circuit assemblies), configured to be mounted within the housing 1810.

Figure 20:
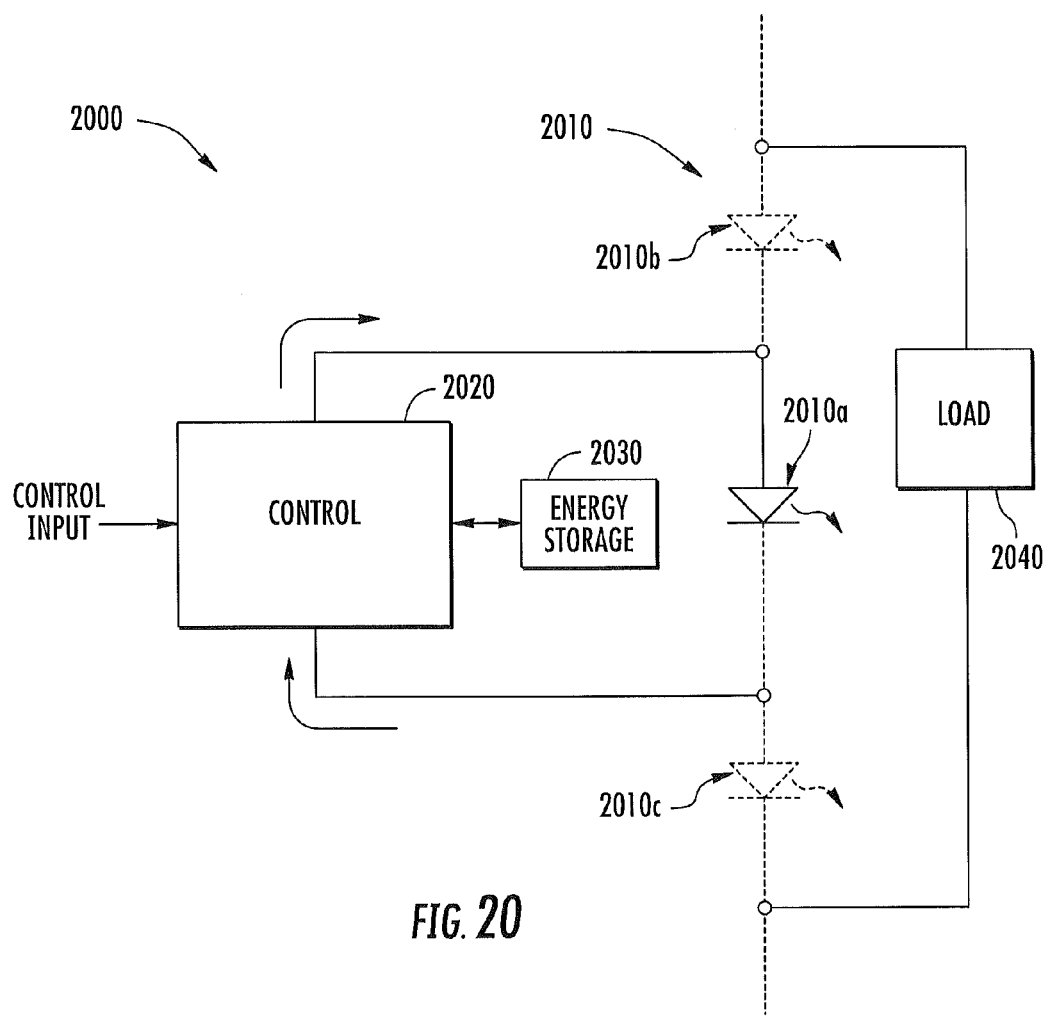
FIG. 20 illustrates a lighting apparatus according to further embodiments.

FIG. 20 illustrates an LED lighting apparatus 2000 according to further embodiments. The apparatus 2000 includes at least one string 2010 of serially connected LED segments, including at least two segments. The segments may include a first segment 2010*a* and at least one other second segment 2010*b*, 2010*c*, which may be coupled on either end of the first segment 2010*a*. The string 2010 may be coupled, for example, to a current source. The apparatus 2000 further includes a control circuit 2020 configured to selectively divert current passing through the first segment 2010*a* into an energy storage device 2030 and to subsequently discharge the energy storage device 2030 through at least the first segment 2010*a*. The energy storage device 2030 may include, for example, at least one inductor, and the control circuit 2020 may perform operations similar to those described above, e.g., such operations may control a relationship between currents in the first segment 2010*a* and the at least one second segment 2010*b*, 2010*c*.

As further shown, the string 2010 is coupled in parallel with another load 2040, which may include, for example, one or more other LEDs, such as another LED string, or other circuitry. For example, the load 2040. The load 2040 may include power supply and/or other circuitry of the apparatus 2000. The control circuit 2020 may be further configured to control relative current levels of the string 2010 and the load 2040 to provide control, for example, of at least one color characteristic (e.g., color point, coordinated color temperature (CCT), color rendering index (CRI), etc.) and/or other characteristics of the light produced by the apparatus 2000.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. A lighting apparatus comprising:
a string of serially-connected light-emitting devices comprising first and second segments;
at least one inductor; and
a control circuit configured to selectively divert current from the first segment to charge the at least one inductor while at least partially bypassing the second segment and to discharge the charged at least one inductor through at least the first segment.

2. The apparatus of claim 1, wherein the control circuit is configured to control a relationship of light outputs of the first and second segments.

3. The apparatus of claim 1, wherein the control circuit is configured to control at least one color characteristic of light produced by the string.

4. The apparatus of claim 1, wherein the control circuit is configured to control a relationship between currents passing through the first and second segments.

5. The apparatus of claim 4, wherein the control circuit is configured to control the relationship responsive to a control input.

6. The apparatus of claim 5, wherein the control input comprises a temperature and/or a dimming level.

7. The apparatus of claim 5, wherein the control circuit is configured to vary a duration of charging of the at least one inductor responsive to the control input.

8. The apparatus of claim 5, wherein the control circuit is configured to charge and discharge the at least one inductor in bursts of multiple charge/discharge cycles with the same first duty cycle, and wherein the control circuit is further configured to vary a second duty cycle of the bursts responsive to the control input.

9. The apparatus of claim 1:
wherein the at least one inductor comprises a first terminal configured to be coupled to a first node of the first segment; and
wherein the control circuit comprises:
a first switch coupled to a second terminal of the at least one inductor and configured to control a current path bypassing the second segment via the at least one inductor; and
a second switch coupled to the second terminal of the at least one inductor and to a second node of the first segment.

10. The apparatus of claim 9, wherein the first switch comprises a transistor and wherein the second switch comprises a diode.

11. The apparatus of claim 1, wherein the first and second segments produce different spectra.

12. The apparatus of claim 11, wherein the first segment produces a predominantly red spectrum and wherein the second segment produces a predominantly white spectrum.

13. The apparatus of claim 11, wherein the first segment produces a predominantly white spectrum and wherein the second segment produces a predominantly red spectrum.

14. The apparatus of claim 1, wherein the string of light-emitting devices comprises at least one light emitting diode (LED).

15. An apparatus comprising:
at least one inductor configured to be coupled to a node of a string of serially-connected light-emitting devices comprising at least a first segment and a second segment; and
a control circuit configured to selectively divert current from the first segment to charge the at least one inductor while at least partially bypassing the second segment and to discharge the charged at least one inductor through at least the first segment.

16. The apparatus of claim 15, wherein the control circuit is configured to control a relationship between currents passing through the first and second segments.

17. The apparatus of claim 16, wherein the control circuit is configured to control the relationship responsive to a control input.

18. The apparatus of claim 17, wherein the control input comprises a temperature and/or a dimming level.

19. The apparatus of claim 17, wherein the control circuit is configured to vary a duration of charging of the at least one inductor responsive to the control input.

20. The apparatus of claim 17, wherein the control circuit is configured to charge and discharge the at least one inductor in bursts of multiple charge/discharge cycles with the same first duty cycle, and wherein the control circuit is further configured to vary a second duty cycle of the bursts responsive to the control input.

21. The apparatus of claim 15:
wherein the at least one inductor comprises a first terminal configured to be coupled to a first node of the first segment; and
wherein the control circuit comprises:
a first switch coupled to a second terminal of the at least one inductor and configured to control a current path bypassing the second segment via the at least one inductor; and
a second switch coupled to the second terminal of the at least one inductor and to a second node of the first segment.

22. The apparatus of claim 21, wherein the first switch comprises a transistor and wherein the second switch comprises a diode.

23. The apparatus of claim 15, wherein the string of light-emitting devices comprises at least one light emitting diode (LED).

24. A lighting apparatus comprising:
a string of serially-connected light-emitting devices comprising at least a first segment and a second segment; and
a control circuit configured to control at relationship between outputs of the first segment and the second segment by diverting current from a node of the string to at least one energy storage device and subsequently transferring energy from the at least one energy storage device to at least the first segment.

25. The apparatus of claim 24, wherein the control circuit is configured to divert the current responsive to a control input.

26. The apparatus of claim 25, wherein the control input comprises a temperature and/or a dimming level.

27. The apparatus of claim 25, wherein the control circuit is configured to vary a duration of transfer of energy from the first segment to the at least one energy storage device responsive to the control input.

28. The apparatus of claim 25, wherein the control circuit is configured to charge and discharge the at least one energy storage device in bursts of multiple charge/discharge cycles having the same first duty cycle, and wherein the control circuit is further configured to vary a second duty cycle of the bursts responsive to the control input.

29. The apparatus of claim 24, wherein the at least one energy storage device comprises at least one inductor.

30. The apparatus of claim 24, wherein the control circuit is configured to control at least one color characteristic of light produced by the string.

31. The apparatus of claim 30, wherein the first and second segments produce different spectra.

32. The apparatus of claim 24, wherein the string of light-emitting devices comprises at least one light emitting diode (LED).

* * * * *